United States Patent [19]
Lee

[11] Patent Number: 6,061,147
[45] Date of Patent: May 9, 2000

[54] APPARATUS AND METHOD FOR DETECTING SCANNING BOUNDARY

[75] Inventor: Carl Lee, Hsinchu, Taiwan

[73] Assignee: Mustek Systems, Inc., Hsinchu, Taiwan

[21] Appl. No.: 08/986,890

[22] Filed: Dec. 8, 1997

[30] Foreign Application Priority Data

May 26, 1997 [TW] Taiwan ................................ 86107110

[51] Int. Cl.[7] ...................................................... H04N 1/00
[52] U.S. Cl. ............................................ 358/406; 358/488
[58] Field of Search ..................................... 358/406, 486, 358/443, 471, 497, 488, 482, 504, 465, 466; 355/75; 399/376; 382/312

[56] References Cited

U.S. PATENT DOCUMENTS

| | | | |
|---|---|---|---|
| 4,933,778 | 6/1990 | Tufano et al. ........................... | 358/488 |
| 5,144,455 | 9/1992 | Stein et al. ............................... | 358/443 |
| 5,198,907 | 3/1993 | Walker et al. ........................... | 358/406 |

*Primary Examiner*—Cheukfan Lee
*Attorney, Agent, or Firm*—Knobbe, Martens, Olson & Bear, LLP

[57] ABSTRACT

An apparatus and method are provided for detecting a scanning boundary of a scanner. The apparatus includes a reference unit, an image-pickup unit, and an operating process unit. The detecting method includes steps of: a) providing an initial optical signal; b) receiving the initial optical signal and generating a reference signal in response to the initial optical signal; c) setting a first reference pixel in the scanner; d) receiving the reference signal and generating a second reference pixel; e) calculating a difference between the first reference pixel and the second reference pixel; and f) detecting the scanning boundary after adjusting the scanner according to the difference.

17 Claims, 2 Drawing Sheets

APPARATUS AND METHOD FOR DETECTING SCANNING BOUNDARY

FIELD OF THE INVENTION

The present invention is related to an apparatus and method for detecting a scanning boundary of an image scanning apparatus.

BACKGROUND OF THE INVENTION

When an object is scanned by a conventional scanner, an adjustable tray is used in the scanner for detecting the left and right margins of the object. However, when assembling the scanner, some errors are always generated so that the left and right margins of the object can not be accurately detected. Furthermore, during the process for adjusting the charge coupled device, even more errors are generated and hence it is necessary to spend much more time on this adjusting work.

SUMMARY OF THE INVENTION

An object of the present invention is to provide a method for detecting a scanning boundary of a scanner having a scanning window.

According to the present invention, the method includes steps of: a) providing an initial optical signal; b) receiving the initial optical signal and generating a reference signal in response to the initial optical signal; c) setting a first reference pixel in the scanner; d) receiving the reference signal and generating a second reference pixel; e) calculating a difference between the first reference pixel and the second reference pixel; and f) detecting the scanning boundary after adjusting the scanner according to the difference.

In accordance with one aspect of the present invention, the initial optical signal is provided by a light source.

In accordance with another aspect of the present invention, the initial optical signal is received by a reference unit for generating the reference signal.

In accordance with another aspect of the present invention, the reference unit is a reflection mark set on the same plane of the scanning window.

In accordance with another aspect of the present invention, the first reference pixel is set in the scanner according to a position of the reference unit.

In accordance with another aspect of the present invention, the reference signal is received by an image-pickup unit for generating the second reference pixel.

In accordance with another aspect of the present invention, the image-pickup unit is a charge coupled device.

In accordance with another aspect of the present invention, a first initial pixel and a second initial pixel are internally set in the image-pickup unit corresponding to two ends of the scanning boundary.

In accordance with another aspect of the present invention, the first initial pixel and the second initial pixel are added by the difference respectively to obtain a first pixel and a second pixel respectively.

In accordance with another aspect of the present invention, the pixels between the first pixel and the second pixel are used for receiving an optical signal of an object.

In accordance with another aspect of the present invention, the difference is calculated from the first reference pixel and the second reference pixel by an operating process unit.

In accordance with another aspect of the present invention, the operating process unit is a hardware circuit.

In accordance with another aspect of the present invention, the operating process unit is a software program.

Another object of the present invention is to provide an apparatus for detecting a scanning boundary of a scanner having a scanning window.

According to the present invention, the apparatus includes: 1) a reference unit mounted on the scanning window for generating a reference signal; 2) an image-pickup unit having a first reference pixel according to a position of the reference unit and receiving the reference signal for generating a second reference pixel; and 3) an operating process unit electrically connected to the image-pickup unit for calculating a difference between the first reference pixel and the second reference pixel for detection of the scanning boundary.

In accordance with one aspect of the present invention, the apparatus further includes a light source for providing an initial optical signal to be received by the reference unit for generating the reference signal.

In accordance with another aspect of the present invention, the apparatus further includes a focusing unit disposed between the reference unit and the image-pickup unit for changing an optical path of the reference signal.

In accordance with another aspect of the present invention, the reference unit is a reflection mark set on the same plane of the scanning window of the scanner.

In accordance with another aspect of the present invention, wherein the image-pickup unit is a charge coupled device.

In accordance with another aspect of the present invention, the operating process unit is a hardware circuit.

In accordance with another aspect of the present invention, the operating process unit is a software program.

The present invention may best be understood through the following description with reference to the accompanying drawings, in which:

DETAILED DESCRIPTION OF THE PREFERRED EMBODIMENT

Figure 1:
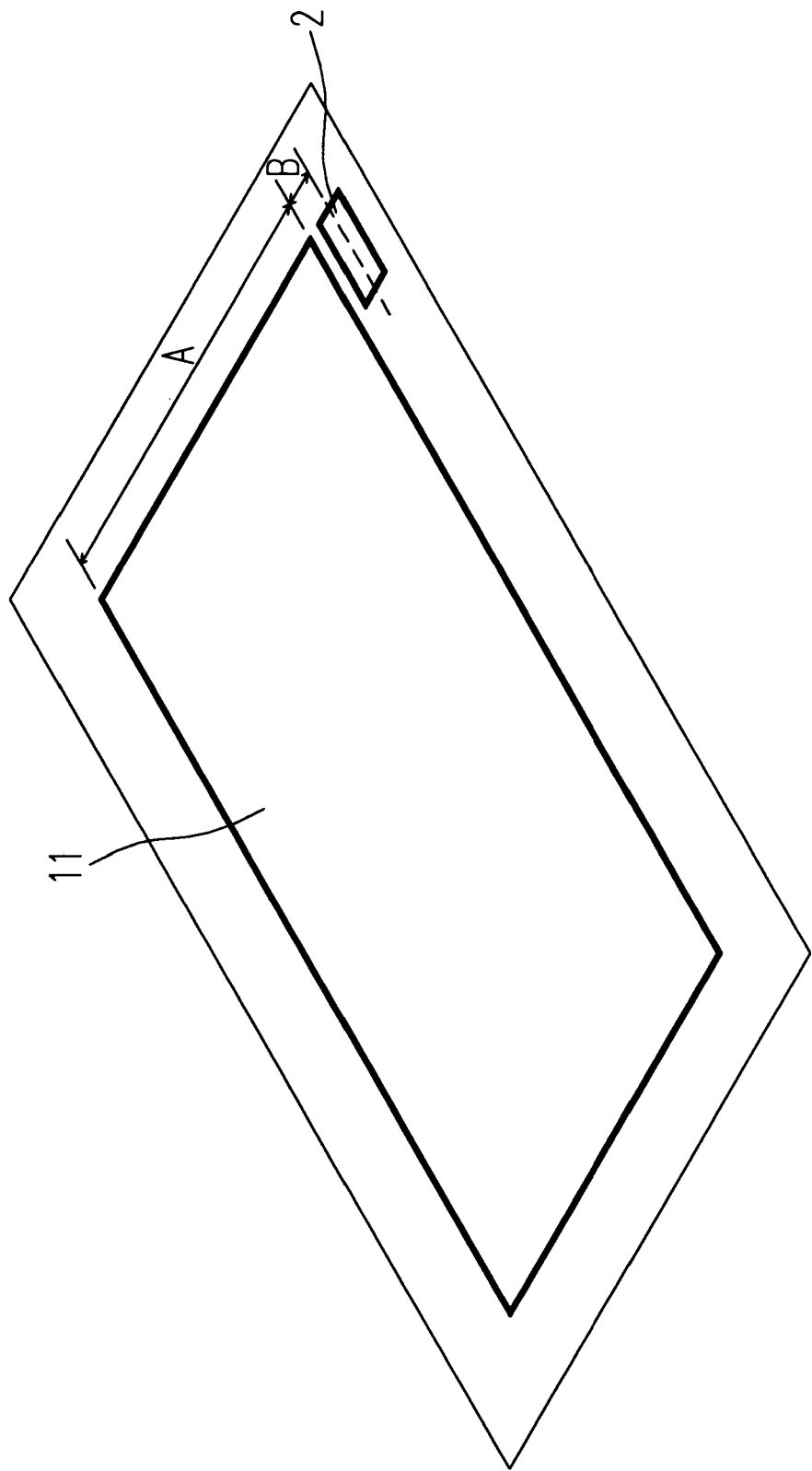
FIG. 1 is a schematic diagram showing a preferred embodiment according to the present invention.

Please refer to FIG. 1 showing a schematic diagram for a preferred embodiment of the present invention. As shown in FIG. 1, the reflective image scanning apparatus includes a scanning window 11, having a scanning boundary A, and a reflection mark 2, wherein the reflection mark 2 is set on the same plane of the scanning window 11 and there is a fixed length B between the reflection mark 2 and the scanning boundary A. An object is put inside the range of the scanning boundary A of the scanning window 11 so that the object can receive the initial optical signal provided by a light source and generate a scanning optical signal. The scanning optical signal is sent to a charge coupled device (CCD) through a focusing unit. The reflection mark 2 can receive the initial optical signal and generate a reference signal.

A first reference pixel is internally set in the charge coupled device according to a position of the reflection mark 2. Before scanning the object, the reference signal can be generated in response to the reflection mark 2 and be received by the charge coupled device for generating a second reference pixel.

The difference between the first reference pixel and the second reference pixel is calculated by an operating process unit electrically connected to the charge coupled device for the detection of the scanning boundary A. A first initial pixel and a second initial pixel are internally set in the charge coupled device corresponding to two ends of the scanning boundary A. The first initial pixel and the second initial pixel are added by the difference respectively to obtain a first pixel and a second pixel respectively. The pixels between the first pixel and the second pixel are used for receiving an scanning optical signal of an object.

Figure 2:
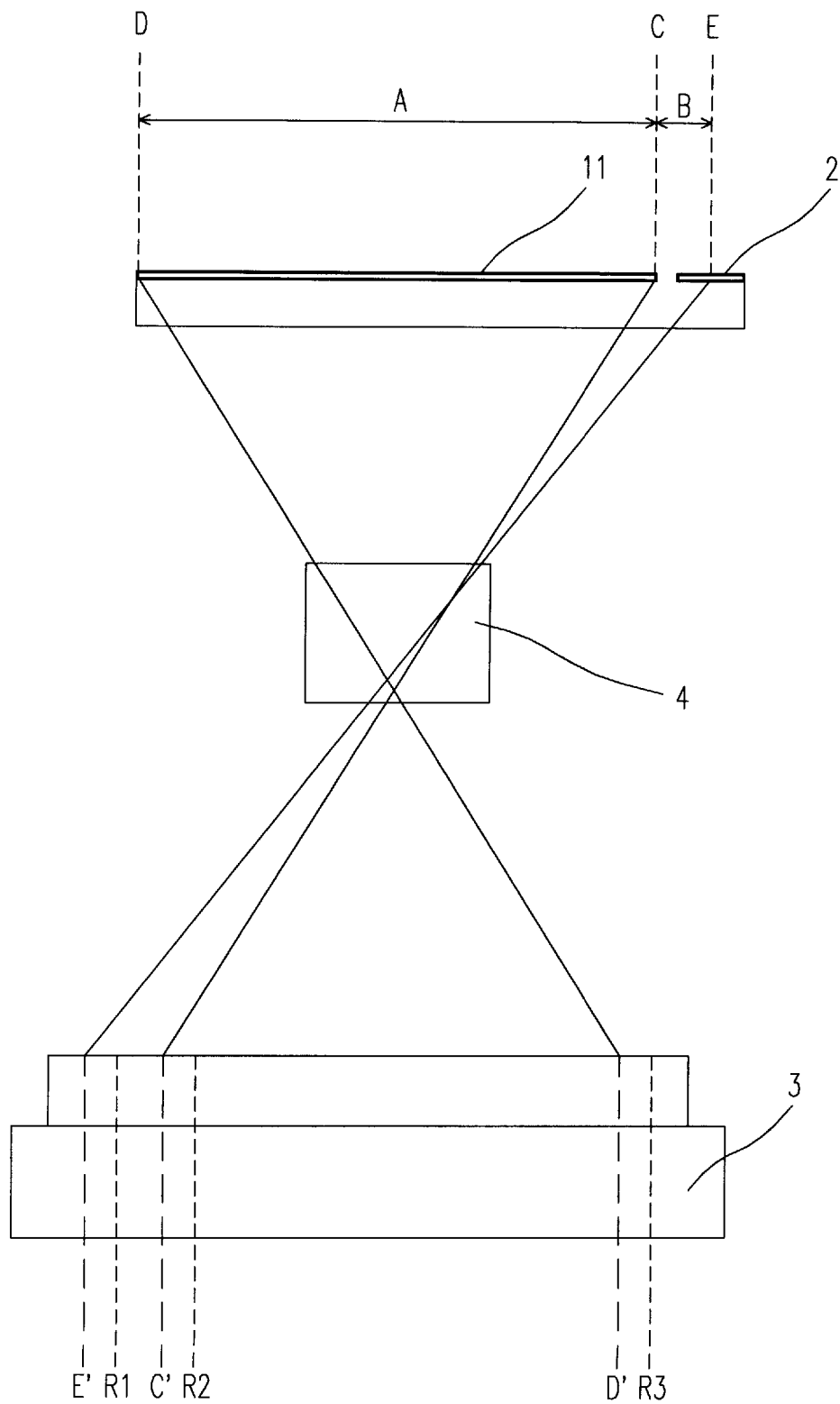
FIG. 2 is a schematic diagram showing a principle of the preferred embodiment according to the present invention.

In order to further understand the preferred embodiment of the present invention, please refer to FIG. 2. Shown in FIG. 2 includes a scanning window 11, a reflection mark 2, a charge coupled device 3, and a focusing unit including a lens 4. The length of the scanning boundary A in the scanning window 11 is the distance between margins C and D. The distance between the central point of the reflection mark 2 and margin C is a fixed length B. A first reference pixel R1 is internally set in the charge coupled device 3 according to the position of the reflection mark 2. A first initial pixel R2 and a second initial pixel R3 are internally set in the charge coupled device 3 corresponding to the margins C and D of the scanning boundary A.

A reference signal is generated when the initial optical signal is received by the reflection mark 2 and then received by the charge coupled device 3. Before scanning the object, a second reference pixel E' is generated in response to a reference signal in the charge coupled device 3. The difference between the first reference pixel R1 and the second reference pixel E' (E'−R1) is calculated by an operating process unit such as a hardware circuit of a software program. The first initial pixel R2 and the second initial pixel R3 are added by the difference (E'−R1) respectively to obtain a first pixel C' and a second pixel D' respectively. The pixels between the first pixel C' and the second pixel D' are used for receiving an optical signal of an object which is put inside the range of the scanning boundary A.

For example, an object of a letter size (its width needs 2550 pixels) is scanned by a scanner with a resolution of 300 dpi (dot per inch). The first initial pixel R2 and the second initial pixel R3 respectively specify the 100th pixel and 2650th pixel, both of which are internally set in the charge coupled device 3. If there is no error generated when the charge coupled device 3 is assembled, the margins C and D of the scanning boundary A will be positioned on the first initial pixel R2 (the 100th pixel) and the second initial pixel R3 (the 2650th pixel) respectively. On the other hand, the 50th pixel is internally set in the charge coupled device 3 and served as the first reference pixel R1. If there is no error generated when the charge coupled device 3 is assembled, the reference signal generated from the reflection mark 2 should be positioned on the second reference pixel E' (the 50th pixel). In fact, the second reference pixel E' is not equal to the reference pixel R1. The reason is described as follows:

During the scanning process, the reference signal is received by the charge coupled device 3 in response to the reflection mark 2 for obtaining the second reference pixel E' (the 40th pixel) and then the substraction operation is executed by the operating process unit so that the difference between the first reference pixel R1 and the second reference pixel E' is 40−50=−10 (pixel). Due to the error resulting in that the charge coupled device 3 is assembled, the scanning image is shifted by 10 pixels. Therefore, the first initial pixel R2 is adjusted by −10+100=90 (pixel) to obtain the first pixel C', the 90th pixel, and the second initial pixel R3 is adjusted by −10+2650=2640 (pixel) to obtain the second pixel D', the 2640th pixel, in the charge coupled device 3 in response to the difference. After the charge coupled device 3 is adjusted, the pixels between the first pixel C' (the 90th pixel) and the second pixel D' (the 2640th pixel) can be used for scanning the object put on the scanning window 11.

In the present invention, the first reference pixel R1 and the first and second initial pixel, R2 and R3, can be set in other different positions respectively corresponding to the different size of the object. Furthermore, the reflection mark 2 can be replaced by the transmitted mark. The present invention can also be applied to the handheld or sheetfed scanner. The reflection mark 2 can be mounted not only on the same plane of the scanning window but also on any one position of the optical path of the initial optical signal as long as the scanning optical signal of the object received by the charge coupled device 3 will not be influenced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting a scanning boundary of a scanner having a scanning window and a reference unit, comprising the steps of:

providing an initial optical signal;

internally setting a first reference pixel in said scanner corresponding to a first position of said reference unit;

receiving said initial optical signal with said reference unit to generate a reference signal;

receiving said reference signal and setting a second reference pixel in response to said received reference signal, the second reference pixel being indicative of a second position of the reference unit;

calculating a difference between said first reference pixel and said second reference pixel; and detecting said scanning boundary after adjusting said scanner according to said difference.

2. The method of claim 1, wherein said initial optical signal is provided by a light source.

3. The method of claim 2, wherein said reference unit is a reflection mark positioned in a plane that includes said scanning window.

4. The method of claim 1, wherein said reference signal is received by an image-pickup unit.

5. The method of claim 4, wherein said image-pickup unit is a charge coupled device.

6. The method of claim 4, further comprising internally setting a first initial pixel and a second initial pixel in said image-pickup unit representing two ends of said scanning boundary.

7. The method of claim 6, further comprising adding said first initial pixel to said difference to obtain a first pixel, and adding said second initial pixel to said difference to obtain a second pixel.

8. The method of claim 7, further comprising using pixels between said first pixel and said second pixel to receive an optical signal of an object.

9. The method of claim 1, further comprising using an operating device to calculate said difference between said first and second reference pixels.

10. The method of claim 9, wherein said operating process unit is a hardware circuit.

11. The method of claim 9, wherein said operating process unit is a software program.

12. An apparatus for detecting a scanning boundary of a scanner having a scanning window, comprising:
- a light source for providing an initial optical signal propagating along an optical path;
- a reference unit mounted on any position within the optical path of said initial optical signal, the reference unit receiving said initial optical signal and generating a reference signal in response to said received initial optical signal;
- an image-pickup unit having a first reference pixel representing a first position of said reference unit, the image-pickup unit receiving said reference signal and generating a second reference pixel in response to said received reference signal, the second reference pixel representing a second position of said reference unit; and
- an operating process unit electrically connected to said image-pickup unit for calculating a difference between said first reference pixel and said second reference pixel for detection of said scanning boundary.

13. The apparatus of claim 12, further comprising a focusing unit disposed between said reference unit and said image-pickup unit for changing an optical path of said reference signal.

14. The apparatus of claim 12, wherein said reference unit is a reflection mark positioned in a plane that includes said scanning window of said scanner.

15. The apparatus of claim 12, wherein said image-pickup unit is a charge coupled device.

16. The apparatus of claim 12, wherein said operating process unit is a hardware circuit.

17. The apparatus of claim 12, wherein said operating process unit is a software program.

* * * * *